US011762810B2

(12) United States Patent
Byron et al.

(10) Patent No.: US 11,762,810 B2
(45) Date of Patent: Sep. 19, 2023

(54) IDENTIFICATION OF RESTRICTORS TO FORM UNIQUE DESCRIPTIONS FOR GENERATION OF ANSWERS TO QUESTIONS

(71) Applicant: International Business Machines Corporation, Armonk, NY (US)

(72) Inventors: Donna K Byron, Petersham, MA (US); Charles E. Beller, Baltimore, MD (US); Edward Graham Katz, Washington, DC (US); Christopher F. Ackermann, Fairfax, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 402 days.

(21) Appl. No.: 16/870,791

(22) Filed: May 8, 2020

(65) Prior Publication Data

US 2021/0349852 A1  Nov. 11, 2021

(51) Int. Cl.
| | |
|---|---|
| *G06F 16/14* | (2019.01) |
| *G06F 16/33* | (2019.01) |
| *G06F 40/30* | (2020.01) |
| *G06N 5/04* | (2023.01) |
| *G06F 40/20* | (2020.01) |
| *G06Q 10/109* | (2023.01) |

(52) U.S. Cl.
CPC ........ *G06F 16/148* (2019.01); *G06F 16/3331* (2019.01); *G06F 40/30* (2020.01); *G06N 5/04* (2013.01); *G06Q 10/109* (2013.01); *G06F 16/334* (2019.01); *G06F 40/20* (2020.01)

(58) Field of Classification Search
CPC ......... G06F 16/148; G06F 40/30; G06N 5/04; G06Q 10/109
See application file for complete search history.

(56) References Cited

U.S. PATENT DOCUMENTS

| | | |
|---|---|---|
| 9,805,613 B2 | 10/2017 | Bagchi et al. |
| 10,353,483 B2 | 7/2019 | Kramer et al. |

(Continued)

OTHER PUBLICATIONS

D. Herrmannova et al., "Unsupervised Identification of Study Descriptors in Toxicology Research: An Experimental Study" dated 2017, Proceedings of the 9th International Workshop on Health Text Mining and Information Analysis, Total 12 pages.

(Continued)

*Primary Examiner* — Kuen S Lu
(74) *Attorney, Agent, or Firm* — KONRAD RAYNES DAVDA & VICTOR LLP; Rabindranath Dutta (57) ABSTRACT

Provided are a method, system, and computer program product in which operations are performed to receive a question that includes a descriptor and an indication that indicates that a unique answer to the question is expected. A determination is made of instances of matching descriptors and descriptor targets from a set of documents. The determined descriptor targets are compared for consistency. In response to determining that the determined descriptor targets are inconsistent, more restrictive descriptors are iteratively generated via a selection model based on metadata associated with the question until the descriptor targets are consistent. An answer to the question is returned from consistent descriptor targets.

20 Claims, 11 Drawing Sheets

(56) References Cited

U.S. PATENT DOCUMENTS

| | | | |
|---|---|---|---|
| 2006/0149720 A1* | 7/2006 | Dehlinger | G06F 16/313 707/E17.084 |
| 2009/0089126 A1* | 4/2009 | Odubiyi | G06Q 10/06393 704/9 |
| 2009/0292687 A1 | 11/2009 | Fan et al. | |
| 2011/0125734 A1* | 5/2011 | Duboue | G09B 7/00 707/723 |
| 2015/0356170 A1 | 12/2015 | Allen et al. | |
| 2016/0162841 A1* | 6/2016 | Albright | G06Q 10/1053 705/321 |
| 2019/0385711 A1* | 12/2019 | Shriberg | G16H 50/20 |
| 2020/0201866 A1* | 6/2020 | Fedorocko | G06F 16/2264 |
| 2021/0256049 A1 | 8/2021 | Byron et al. | |

OTHER PUBLICATIONS

"Performance Descriptors for Language Learners" dated 2015, ACTFL, Total 22 pages.

"Implicit Country Filtering" dated Feb. 8, 2019, An IP.com Prior Art Database Technical Disclosure for IP.com No. IPCOM000257395D, Total 4 pages.

"Context Based Question Auto-Completion and Suggested Answers for Messaging" dated Feb. 28, 2017, An IP.com Prior Art Database Technical Disclosure for IP.com No. IPCOM000249464D, Total 7 pages.

U.S. Patent Application, dated Feb. 17, 20, for U.S. Appl. No. 16/792,456, filed Feb. 17, 20, Total 41 pages.

\* cited by examiner

Example of a data structure of a descriptor resource

BASE: STAR mod: Football<SPORTS> SPEC: none
BASE: CEO mod: XYZ<Company> time: 2012 SPEC: def
BASE: Executive mod: Business mod: American<NATIONALITY> SPEC: indef
BASE: Chairwoman mod: ABC<Company> SPEC: def
BASE: President mod: ABC<Company> SPEC: def
BASE: CEO mod: ABC<Company> SPEC: def
BASE: WOMAN mod: first mod: ABC<Company>
BASE: personality mod: TV SPEC: none

Document initial definite mentions to determine a set of descriptors and targets

'[John Smith], CEO of ABC, ...'

'CEO of ABC [Mary Brown]...'

'Jack Green was the founding [CEO of ABC]...'

IDENTIFICATION OF RESTRICTORS TO FORM UNIQUE DESCRIPTIONS FOR GENERATION OF ANSWERS TO QUESTIONS

BACKGROUND

1. Field

Embodiments relate to the identification of restrictors to form unique description for generation of answers to questions.

2. Background

A natural language processing system implemented in a computation device may process queries to answer questions asked by a user. The natural language processing system may first perform a lexical analysis for identifying and analyzing the structure of words. Then a syntactic analysis may be performed for analysis of words in the sentence for grammar and arranging words in a manner that shows the relationship among the words.

Subsequent to syntactic analysis, a semantic analysis may be performed to derive meaning from the text. Then pragmatic analysis may be performed to incorporate those aspects of language that require real world knowledge. Many different types of natural language based question and answering systems that perform an analysis of existing documents to answer questions are currently in use.

SUMMARY OF THE PREFERRED EMBODIMENTS

Provided are a method, system, and computer program product in which operations are performed to receive a question that includes a descriptor and an indication that indicates that a unique answer to the question is expected. A determination is made of instances of matching descriptors and descriptor targets from a set of documents. The determined descriptor targets are compared for consistency. In response to determining that the determined descriptor targets are inconsistent, more restrictive descriptors are iteratively generated via a selection model based on metadata associated with the question until the descriptor targets are consistent. An answer to the question is returned from consistent descriptor targets.

In further embodiments, the metadata associated with the question comprises information about a user from whom the question is received.

In additional embodiments, the metadata associated with the question also comprises attributes of a query session that includes the question.

In further embodiments if an indication of a specific time period is unavailable in the attributes of the query session or in the question then information associated with a more recent time period is provided in the answer.

In yet further embodiments, if an indication of a geographical location is unavailable in the attributes of the query session or in the question then information associated with a location of the user is provided in the answer.

In certain embodiments the more restrictive descriptors are based on an aspect selected from a group consisting of year, demographic information and location.

In additional embodiments a plurality of restrictor options that have been used are returned with the answer.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

When the textual evidence source for a semantic interpretation task (e.g., a question answering system) is a large semi-structured collection or a web-scale document corpus, one difficulty that arises is that there are often many entities mentioned in the corpus that satisfy the specification mentioned in the question. For example the query 'Who is the CEO of ABC?' may match many documents describing multiple people who may have served in the CEO role for ABC Corporation. In terms of evidence calculation, there may be many more documented mentions of some particular person, and this may erroneously suggest a relatively more famous previous CEO as the CEO of ABC Corporation, rather than the current CEO.

Having a helpful signal that a missing restrictor needs to be recovered from the context to select the most appropriate answer for the question is helpful. Such information may be recovered from statements that differentiate items that can describe many people from items that are forced to be unique. The descriptor CEO describes many people but for each company there is only one CEO. The question answering system may need to enrich the question with restrictors before selecting among candidate answers.

In certain embodiments, a question answering system receives a question with a description and an indication that the user expects the description to be unique (e.g. the question has a definite article). The search results may return a number of candidate answers that cannot be merged together, which suggests that the description was not sufficiently specified to be unique in the corpus of documents searched. Additional restrictors that make the description unique are determined. The system then tests each of these more fully specified descriptions in the search results and returns candidate answers that satisfy them to arrive at a unique answer. As a result, improvements are made to the operations of a question answering system in a computational device.

Exemplary Embodiments

Figure 1:
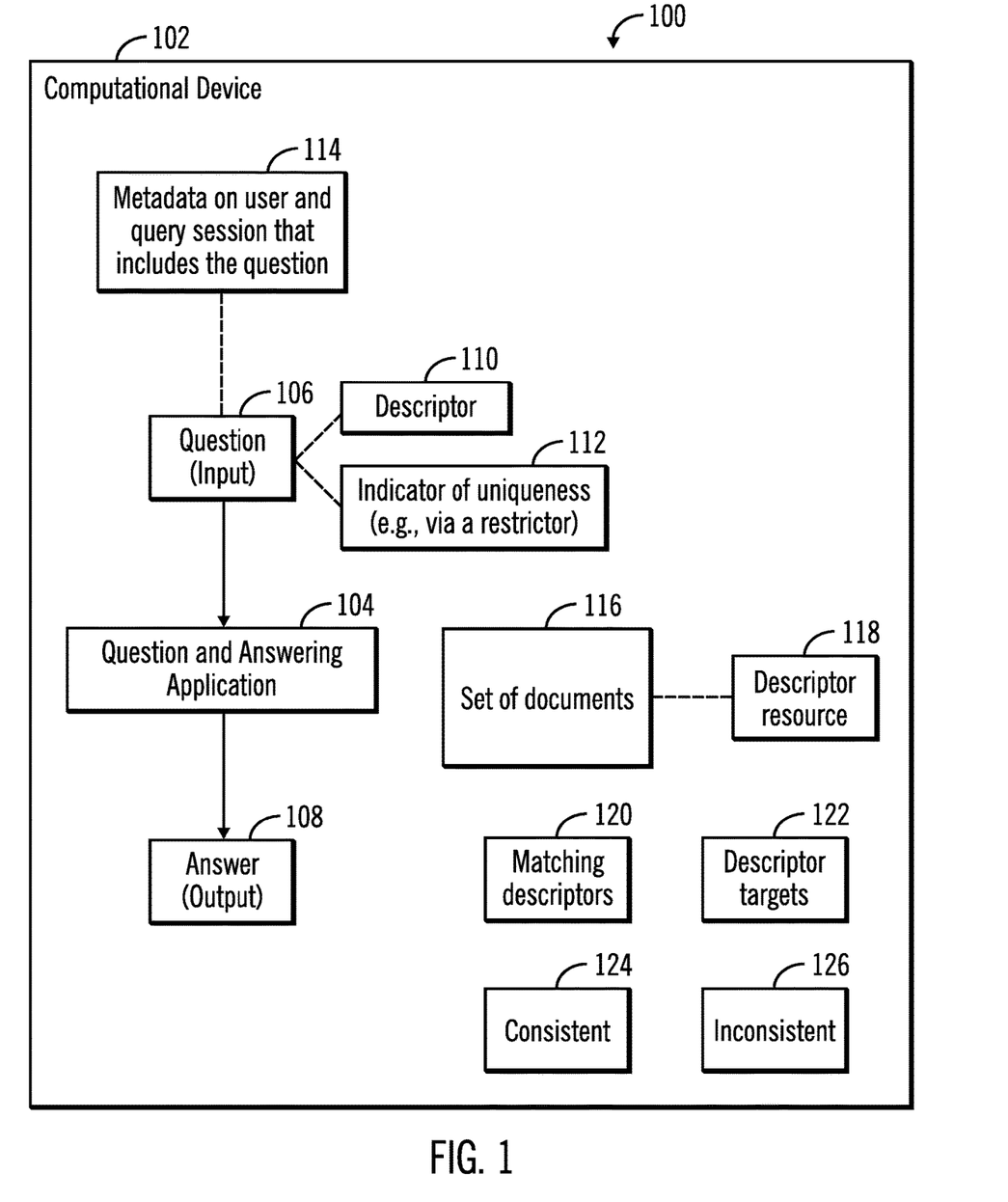
FIG. 1 illustrates a block diagram of a computing environment comprising a computational device that executes a question and answering application, in accordance with certain embodiments.

FIG. 1 illustrates a block diagram of a computing environment 100 comprising a computational device 102 that executes a question and answering application 104.

The computational device 102 may comprise any suitable computational device including those presently known in the art, such as, a personal computer, a workstation, a server, a mainframe, a hand held computer, a palm top computer, a telephony device, a network appliance, a blade computer, a processing device, a controller, etc. The computational device 102 may be an element in any suitable network, such as, a storage area network, a wide area network, the Internet, an intranet. In certain embodiments, the computational device 102 may be an element in a cloud computing environment.

In certain embodiments, the question and answering application 104 may be implemented in software, firmware, hardware or any combination thereof. A user inputs a question to the question and answering application 104, and in response the question and answering application 104 responds with an answer 108 (i.e., an output) to the user.

The question and answering application 104 determines the descriptor 110 and an indicator of uniqueness 112 for the question 106. For example, in the question "Who is the CEO of ABC?", the determined descriptor is the "CEO of ABC" and the definite article "the" is an indicator of uniqueness as only a single CEO's name is expected by the user. In certain embodiments, metadata 114 on the user and the query session that includes the question may be used by the question and answering application 104 to create additional restrictors on the question 106 besides the definite article "the" for providing the answer 108.

The question and answering application 104 analyzes a set of documents 116 and corresponding descriptor resources derived from the set of documents 116 to generate matching descriptors 120 and descriptor targets 122. For example, the set of documents 116 may provide a plurality of descriptor targets 122 that may potentially be an answer to the question 106. The descriptor targets may be consistent 124 (i.e., all descriptor targets are referring to the same entity) or inconsistent 126 (i.e., not all descriptor targets are referring to the same entity). If the descriptor targets are consistent then a unique answer is returned. Otherwise, more restricted descriptors are employed until a unique answer is determined.

Figure 2:
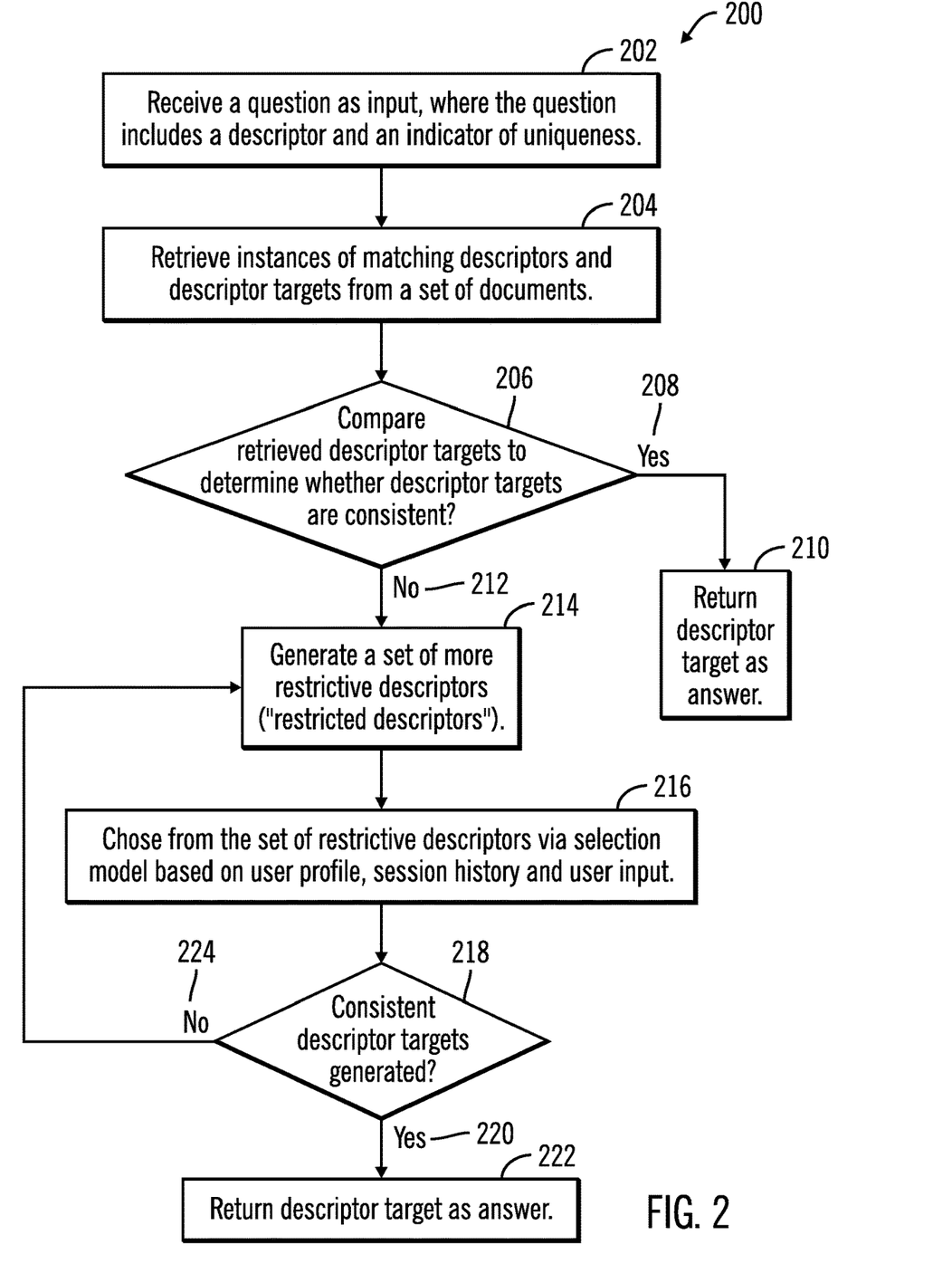
FIG. 2 illustrates a flowchart that shows operations performed by the question and answering application, in accordance with certain embodiments.

FIG. 2 illustrates a flowchart 200 that shows operations performed by the question and answering application 104, in accordance with certain embodiments.

Controls starts at block 202, in which the question and answering application 104 receives 106 a question as input, the question containing a descriptor 110 and an indicator of uniqueness 112 via a restrictor. The question and answering application 104 retrieves (at block 204) instances of matching descriptors and descriptor targets from a corpus of documents 116 or a descriptor resource 118.

From block 204 control proceeds to block 206 in which the question and answering application 104 compare retrieved descriptor targets to determine whether descriptor targets are consistent, If so ("Yes" branch 208), the consistent descriptor target is returned (at block 210) as the answer.

If the descriptor targets are inconsistent ("No" branch 212), then the question and answering application 104 generates (at block 214) a set of more restrictive descriptors ("restricted descriptors"), and then the question and answering application 104 choses (at block 216) from the set of restrictive descriptors via a selection model based on user profile, session history and user input. Control proceeds to block 218 in which a determination is made as to whether consistent descriptor targets have been generated. If so ("Yes" branch 218) then the consistent descriptor target is return (at block 222) as the answer, otherwise ("no" branch 224) control returns to block 214 for generating a set of more restrictive descriptors iteratively.

Figure 3:
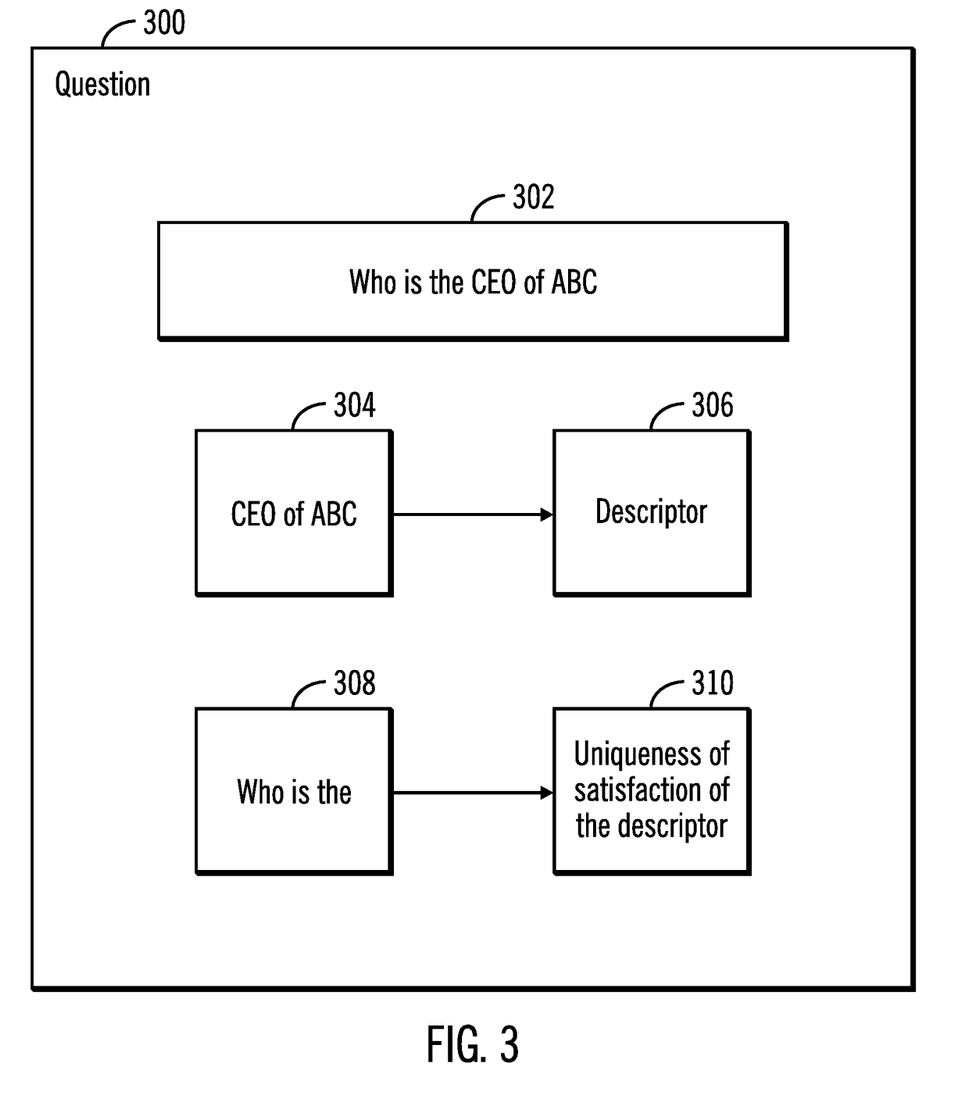
FIG. 3 illustrates a block diagram that shows an example of a question, in accordance with certain embodiments.

FIG. 3 illustrates a block diagram 300 that shows an example of a question that is received in block 202, in accordance with certain embodiments.

An exemplary question may be "Who is the CEO of ABC" (reference numeral 302). In this question the term "CEO of ABC" 304 is the descriptor 306, and the term "Who is the" 308 is an indicator 310 of uniqueness of satisfaction of the descriptor 304. Questions may typically include the definite article (e.g. 'the CEO'), but may also be possessives (e.g. 'ABC's CEO').

Figure 4:
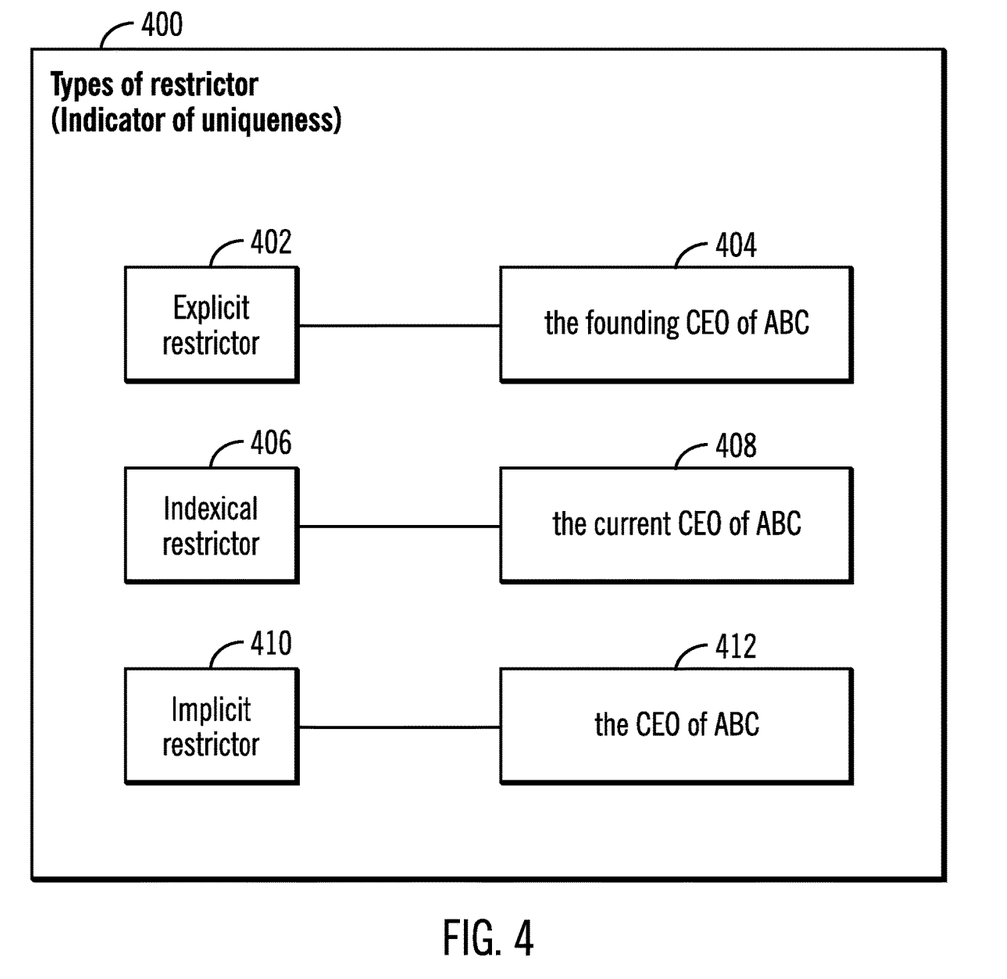
FIG. 4 illustrates a block diagram that types of restrictors associated with a question, in accordance with certain embodiments.

FIG. 4 illustrates a block diagram 400 that shows the types of restrictors associated with a question, in accordance with certain embodiments.

An example of an explicit descriptor 402 is "the founding CEO of ABC" 404. An example of an indexical restrictor 406 is "the current CEO of ABC" 408. An example of an implicit restrictor 410 is "the CEO of ABC" 412. A user may ask a question with explicit, indexical or implicit restrictors.

Figure 5:
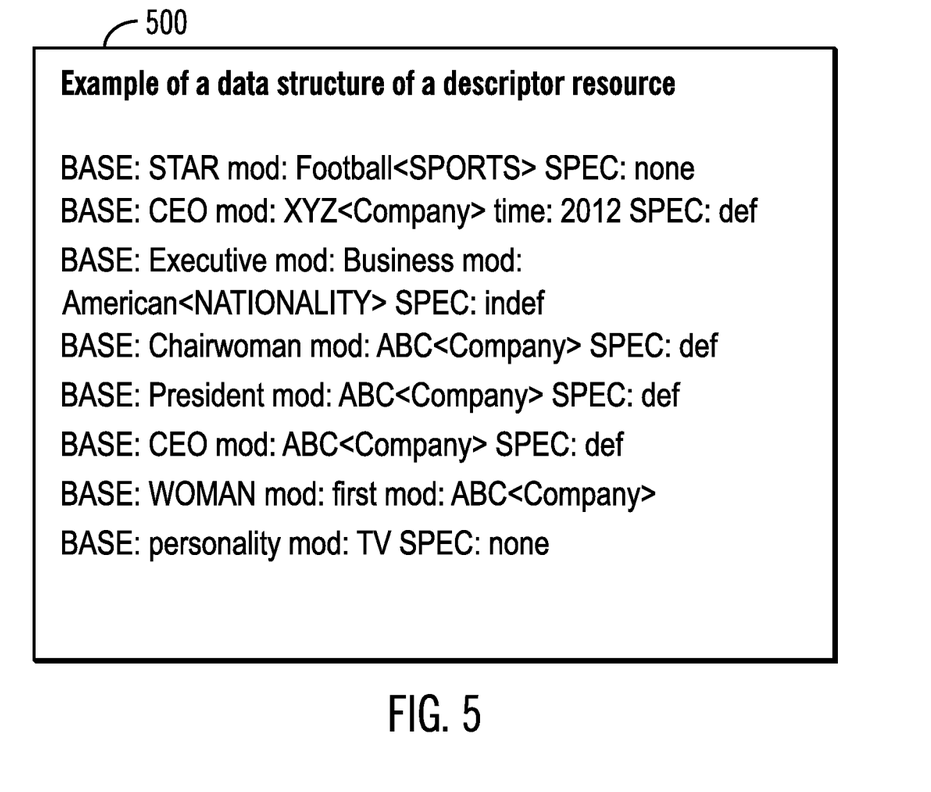
FIG. 5 illustrates a block diagram that shows an example of a data structure of a descriptor resource, in accordance with certain embodiments.

FIG. 5 illustrates a block diagram 500 that shows an example of a data structure of a descriptor resource 118, in accordance with certain embodiments. The data structure 500 may be constructed differently in different embodiments and are based on analysis of the set of documents 116 to include information on descriptors and descriptor targets derived from the set of documents 116. The data structure 500 may be queried for determining matching descriptor and descriptor targets corresponding to a question.

Figure 6:
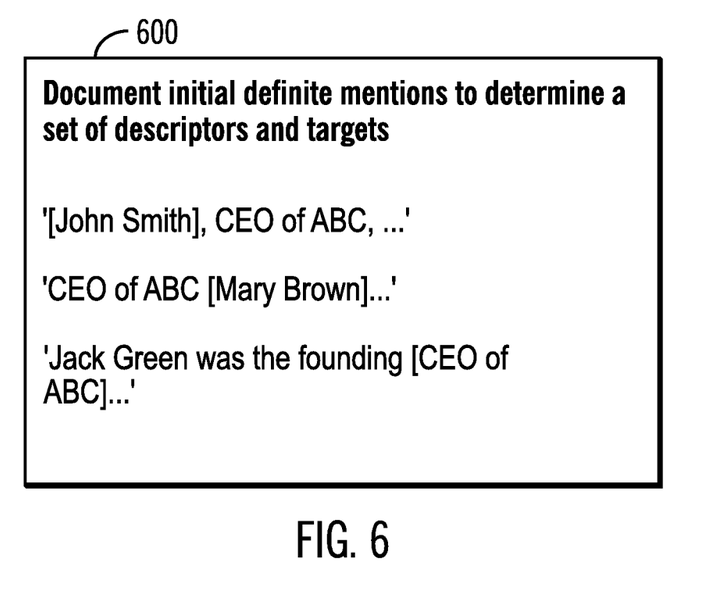
FIG. 6 illustrates a block diagram that shows how documents are analyzed to determine a set of matching descriptors and descriptor targets, in accordance with certain embodiments.

FIG. 6 illustrates a block diagram 600 that shows how documents are analyzed to determine a set of matching descriptors and descriptor targets, in accordance with certain embodiments. A search and other operations may be performed on the set of documents 116 to determine the set of matching descriptors and descriptor targets corresponding to a question.

In one embodiment, the descriptor and descriptor targets obtained are as follows:

'[John Smith], CEO of ABC, . . . '
'CEO of ABC [Mary Brown] . . . '
'Jack Green was the founding [CEO of ABC] . . . '

It may be observed that there are inconsistent descriptor targets "John Smith" and "Mary Brown" in the example.

Figure 7:
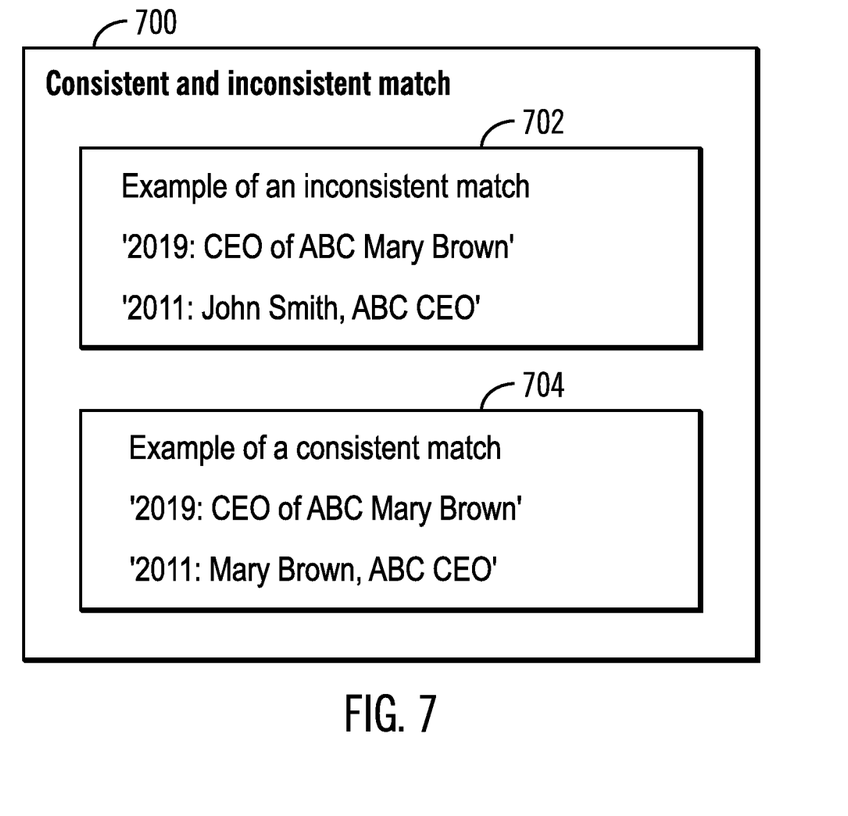
FIG. 7 illustrates a block diagram that shows consistent and inconsistent descriptor targets, in accordance with certain embodiments.

FIG. 7 illustrates a block diagram 700 that shows consistent 704 and inconsistent 702 descriptor targets, in accordance with certain embodiments. In block 702, both Mary Brown and John Smith are descriptor targets when determining the CEO of ABC, and this is an inconsistent match and a set of more restrictive descriptors have to be used (as show in block 214).

In certain embodiments if there is a temporal restrictor in the year mentioned then a time-based restriction may be inferred. Other restrictions may be inferred from looking at the parse trees of the sentences where descriptions occur. Modifiers to the description are included in the set of available restrictors.

In certain embodiments, to choose from the set of restrictive descriptors via a election model based on user profile, session history and user input as shown in block 216 of FIG. 2, inferred restrictors based on geographic, temporal, or topic information may be used by the selection model based on attributes of the user or query session. For example, in the absence of overt temporal information a recency bias might exist whereby CEOs from recent years are selected over past CEOs. But if a user has been performing queries around a specific year (e.g. 2010) then restrictors that match that year may be preferred.

Similarly, in the absence of geographic information, restrictors matching the user's location may be preferred (e.g. 'American' over 'French'). However, if the query session has been previously directed towards information about a specific country, France, or that country's personalities, a restrictor "France" may be preferred.

In certain embodiments, multiple restrictor options may be returned along with their targets. The restrictors may become annotations of the answer terms or inputs to a scoring or ranking model.

In an example, the following descriptors need successive restriction until they result in a single answer:

Gold Medalist

American Gold Medalist

American Gold Medalist in the 200 m

American Gold Medalist in the 200 m at the 1996 Olympics.

Figure 8:
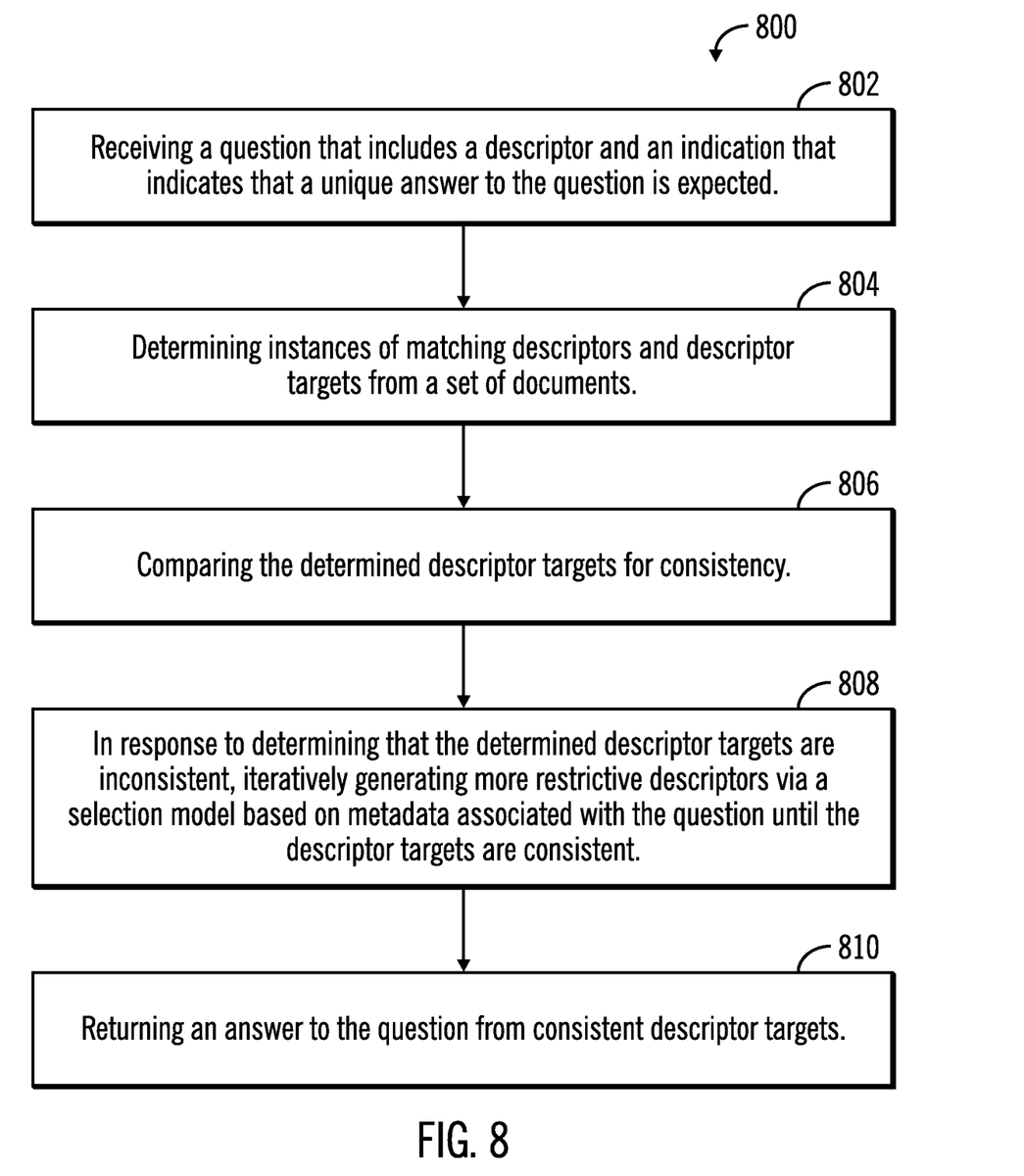
FIG. 8 illustrates another flowchart that shows operations performed by the question and answering application, in accordance with certain embodiments.

FIG. 8 illustrates another flowchart 800 that shows operations performed by the question and answering application 104, in accordance with certain embodiments.

Operations are performed (at block 802) to receive a question 106 that includes a descriptor 110 and an indication 112 that indicates that a unique answer to the question is expected. Control proceeds to block 804 in which a determination is made of instances of matching descriptors 120 and descriptor targets 122 from a set of documents 116.

The determined descriptor targets 122 are compared (at block 806) for consistency. In response to determining that the determined descriptor targets 122 are inconsistent, iteratively more restrictive descriptors are generated (at block 808) via a selection model based on metadata 114 associated with the question until the descriptor targets 122 are consistent. An answer 108 to the question 106 is returned (at block 810) from consistent descriptor targets.

Therefore, FIGS. 1-8 enhances a question and answering system by iteratively adding restrictors to generate a more appropriate answer to a question.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
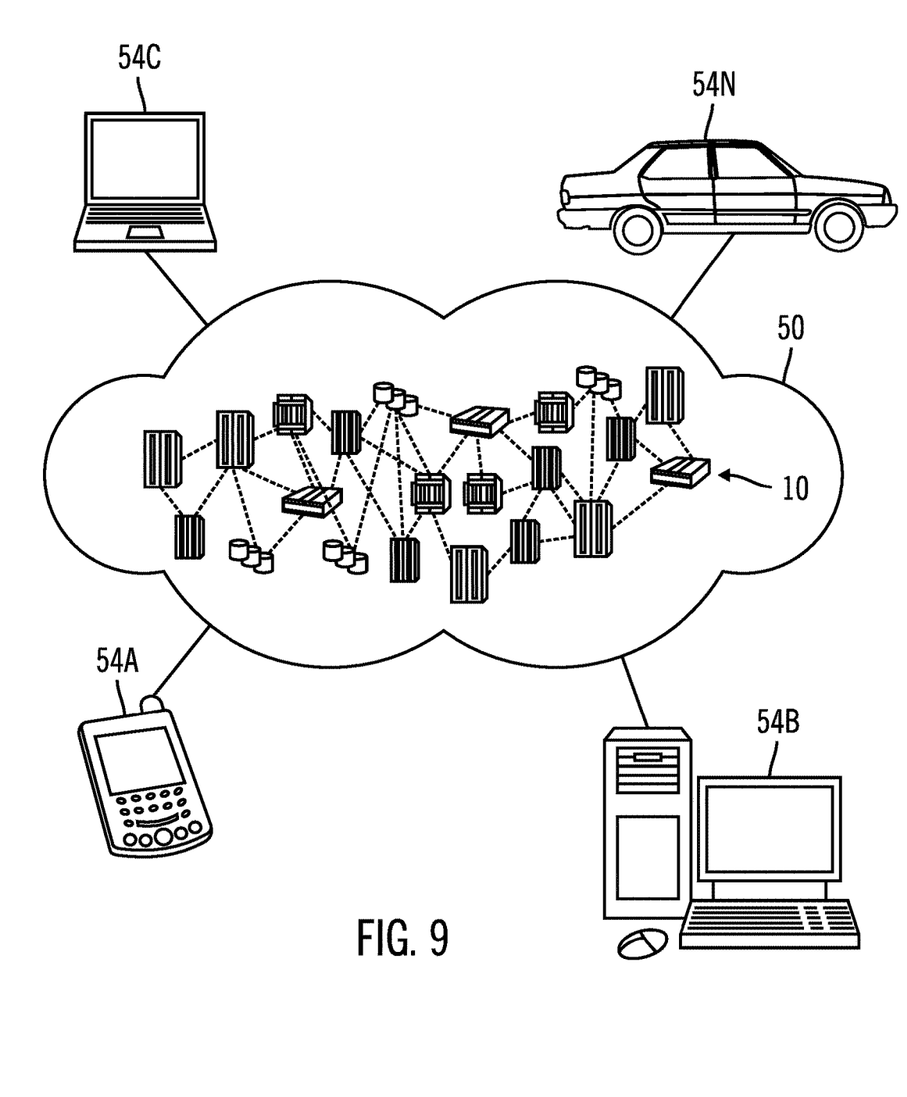
FIG. 9 illustrates a block diagram of a cloud computing environment, in accordance with certain embodiments.

Referring now to FIG. 9 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 14 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
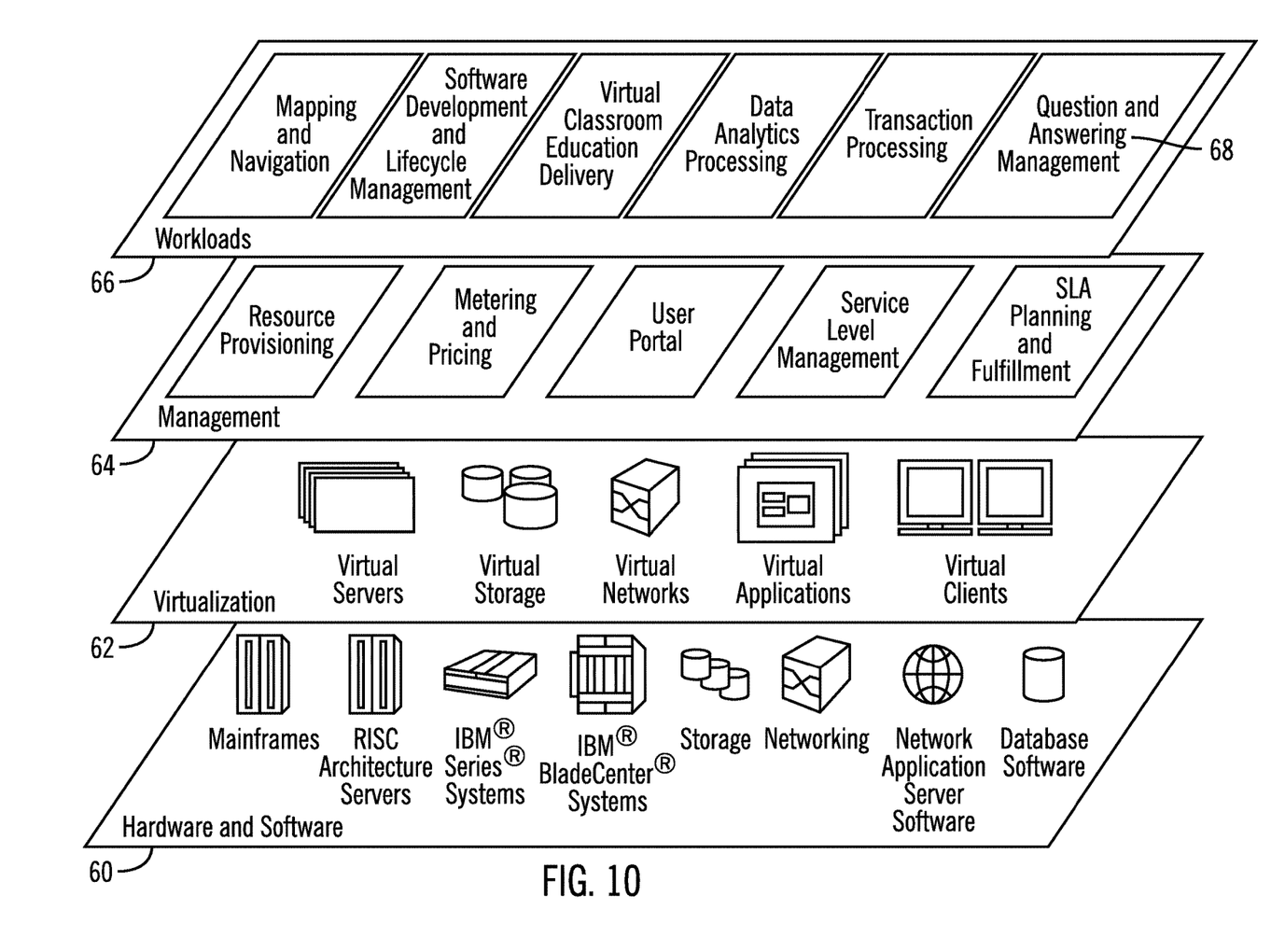
FIG. 10 illustrates a block diagram of further details of the cloud computing environment of FIG. 9, in accordance with certain embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

*IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized.

Examples of workloads and functions which may be provided from this layer include: mapping and navigation; software development and lifecycle management; virtual classroom education delivery; data analytics processing; transaction processing; and question and answering management 68 as shown in FIGS. 1-10.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
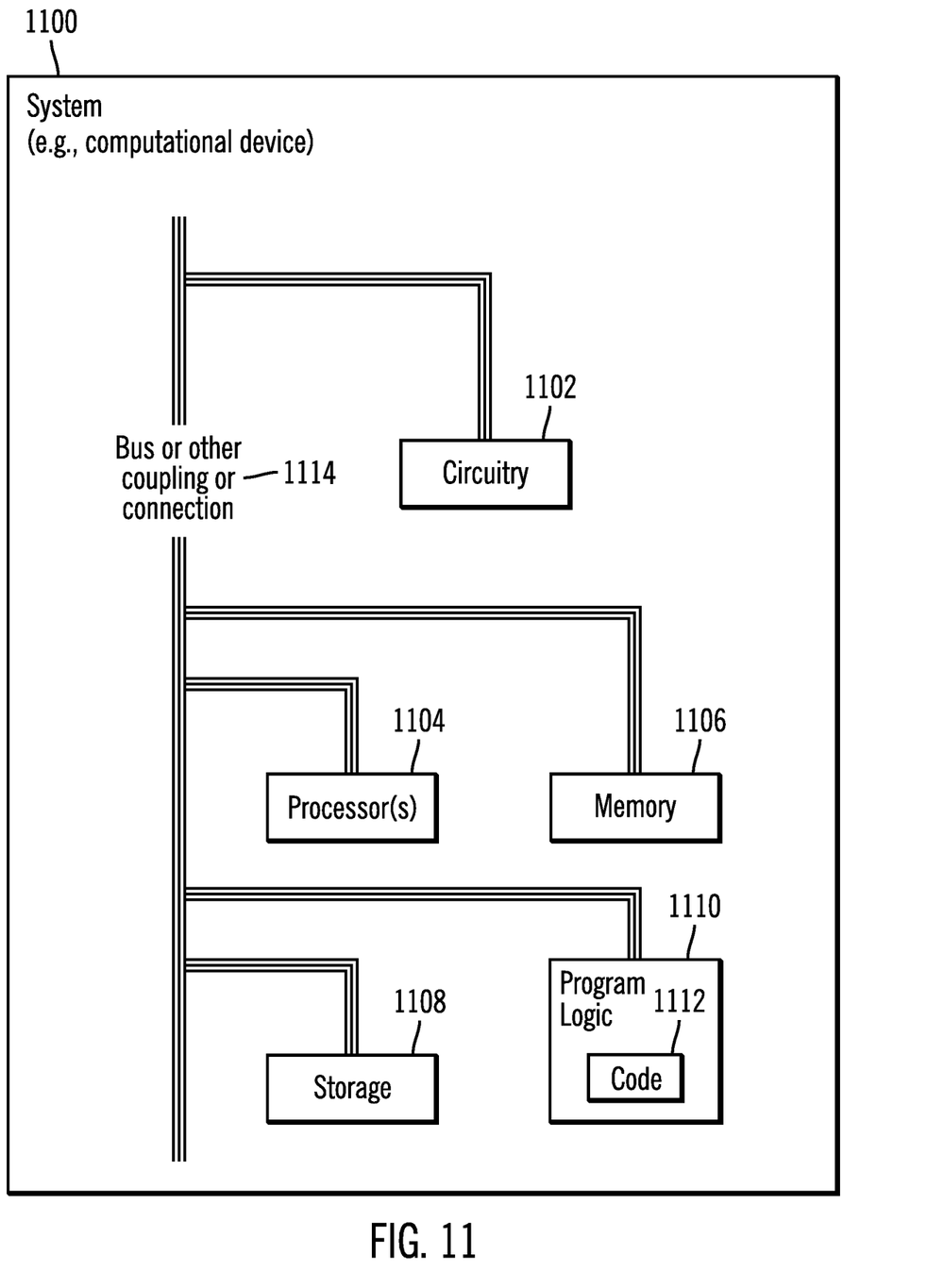
FIG. 11 illustrates a block diagram of a computational system as described in FIGS. 1-10, in accordance with certain embodiments.

FIG. 11 illustrates a block diagram that shows certain elements that may be included in the computational device 102 in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. One or more of the components in the system 1100 may communicate via a bus or via other coupling or connection 1114. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
  receiving, by a question and answering application comprising a semantic interpretation task for a semi-structured collection executing in a computational device, a question that includes a descriptor and an indication that indicates that a unique answer to the question is expected, wherein types of indication include an explicit restrictor, an indexical restrictor, and an implicit restrictor in the question;
  determining instances of matching descriptors and descriptor targets from a set of documents, wherein the determined descriptor targets comprise answers to questions;
  comparing the determined descriptor targets for consistency, wherein the determined descriptor targets are consistent, in response to all the determined descriptor targets referring to an identical entity, and wherein the determined descriptor targets are inconsistent, in response to all the determined descriptor targets not referring to the identical entity;

in response to determining that the determined descriptor targets are inconsistent, iteratively generating more restrictive descriptors via a selection model based on metadata associated with the question until the descriptor targets are consistent; and returning an answer to the question from consistent descriptor targets.

2. The method of claim 1, wherein the metadata associated with the question comprises information about a user from whom the question is received.

3. The method of claim 2, wherein the metadata associated with the question also comprises attributes of a query session that includes the question.

4. The method of claim 3, wherein if an indication of a specific time period is unavailable in the attributes of the query session or in the question then information associated with a more recent time period is provided in the answer.

5. The method of claim 3, wherein if an indication of a geographical location is unavailable in the attributes of the query session or in the question then information associated with a location of the user is provided in the answer.

6. The method of claim 1, wherein the more restrictive descriptors are based on an aspect selected from a group consisting of year, demographics and location.

7. The method of claim 1, wherein a plurality of restrictor options that have been used are returned with the answer.

8. A system, comprising:
a memory; and
a processor coupled to the memory, wherein the processor performs operations, the operations performed by the processor comprising:
receiving, by a question and answering application comprising a semantic interpretation task for a semi-structured collection executing in a computational device, a question that includes a descriptor and an indication that indicates that a unique answer to the question is expected, wherein types of indication include an explicit restrictor, an indexical restrictor, and an implicit restrictor in the question;
determining instances of matching descriptors and descriptor targets from a set of documents, wherein the determined descriptor targets comprise answers to questions;
comparing the determined descriptor targets for consistency, wherein the determined descriptor targets are consistent, in response to all the determined descriptor targets referring to an identical entity, and wherein the determined descriptor targets are inconsistent, in response to all the determined descriptor targets not referring to the identical entity;
in response to determining that the determined descriptor targets are inconsistent, iteratively generating more restrictive descriptors via a selection model based on metadata associated with the question until the descriptor targets are consistent; and
returning an answer to the question from consistent descriptor targets.

9. The system of claim 8, wherein the metadata associated with the question comprises information about a user from whom the question is received.

10. The system of claim 9, wherein the metadata associated with the question also comprises attributes of a query session that includes the question.

11. The system of claim 10, wherein if an indication of a specific time period is unavailable in the attributes of the query session or in the question then information associated with a more recent time period is provided in the answer.

12. The system of claim 10, wherein if an indication of a geographical location is unavailable in the attributes of the query session or in the question then information associated with a location of the user is provided in the answer.

13. The system of claim 8, wherein the more restrictive descriptors are based on an aspect selected from a group consisting of year, demographics and location.

14. The system of claim 8, wherein a plurality of restrictor options that have been used are returned with the answer.

15. A computer program product, the computer program product comprising a computer readable storage medium having computer readable program code embodied therewith, the computer readable program code configured to perform operations, the operations comprising:
receiving, by a question and answering application comprising a semantic interpretation task for a semi-structured collection executing in a computational device, a question that includes a descriptor and an indication that indicates that a unique answer to the question is expected, wherein types of indication include an explicit restrictor, an indexical restrictor, and an implicit restrictor in the question;
determining instances of matching descriptors and descriptor targets from a set of documents, wherein the determined descriptor targets comprise answers to questions;
comparing the determined descriptor targets for consistency, wherein the determined descriptor targets are consistent, in response to all the determined descriptor targets referring to an identical entity, and wherein the determined descriptor targets are inconsistent, in response to all the determined descriptor targets not referring to the identical entity;
in response to determining that the determined descriptor targets are inconsistent, iteratively generating more restrictive descriptors via a selection model based on metadata associated with the question until the descriptor targets are consistent; and
returning an answer to the question from consistent descriptor targets.

16. The computer program product of claim 15, wherein the metadata associated with the question comprises information about a user from whom the question is received.

17. The computer program product of claim 16, wherein the metadata associated with the question also comprises attributes of a query session that includes the question.

18. The computer program product of claim 17, wherein if an indication of a specific time period is unavailable in the attributes of the query session or in the question then information associated with a more recent time period is provided in the answer.

19. The computer program product of claim 17, wherein if an indication of a geographical location is unavailable in the attributes of the query session or in the question then information associated with a location of the user is provided in the answer.

20. The computer program product of claim 15, wherein the more restrictive descriptors are based on an aspect selected from a group consisting of year, demographics and location.

* * * * *